A. J. DOTY.
CHANGING BATTERIES IN ELECTRICALLY PROPELLED VEHICLES.
APPLICATION FILED FEB. 3, 1908.
900,359.
Patented Oct. 6, 1908.
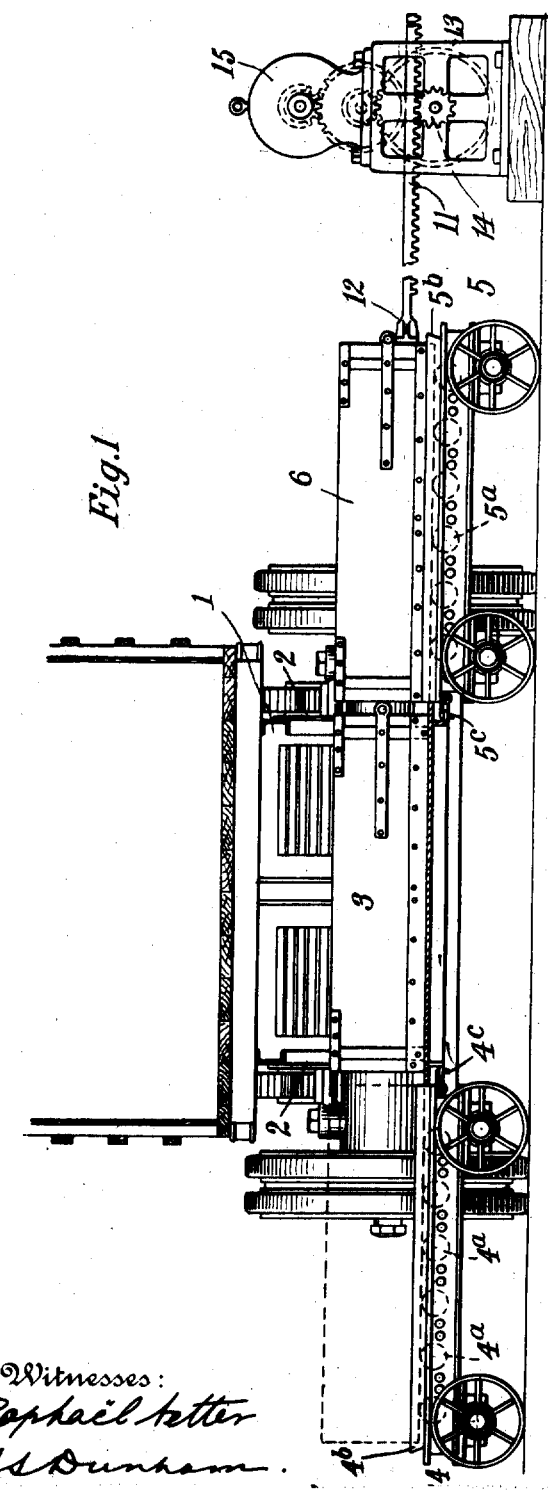
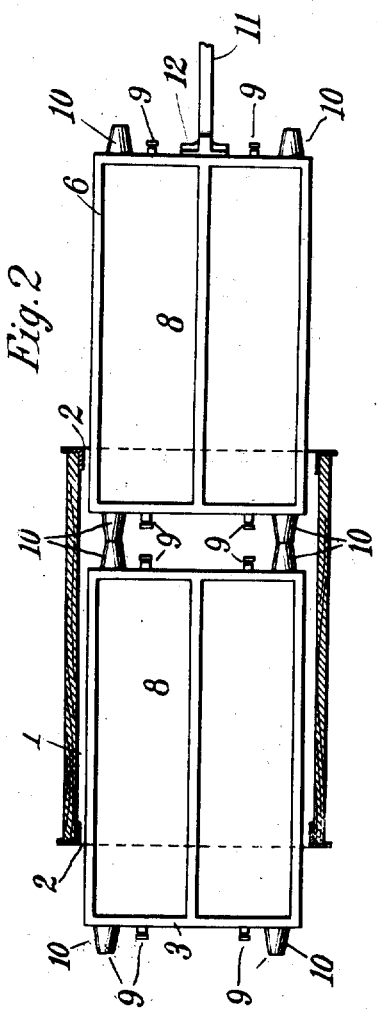
Witnesses:
Raphael Netter
S S Dunham
Albert J. Doty
Inventor
By his Attorneys
Kerr, Page & Cooper

UNITED STATES PATENT OFFICE.

ALBERT J. DOTY, OF MOUNT VERNON, NEW YORK, ASSIGNOR OF ONE-HALF TO CHARLES BERG, OF PHILADELPHIA, PENNSYLVANIA.

CHANGING BATTERIES IN ELECTRICALLY-PROPELLED VEHICLES.

No. 900,359.      Specification of Letters Patent.      Patented Oct. 6, 1908.

Application filed February 3, 1908. Serial No. 413,948.

*To all whom it may concern:*

Be it known that I, ALBERT J. DOTY, a citizen of the United States, residing at Mount Vernon, in the county of Westchester and State of New York, have invented certain new and useful Improvements in Changing Batteries in Electrically-Propelled Vehicles, of which the following is a specification.

In vehicles propelled by current from a storage battery carried by the vehicle it is necessary, when the battery is exhausted, either to recharge the exhausted battery or to substitute a fresh battery therefor. The recharging method requires some time, however, and hence the latter plan is preferred, particularly by concerns operating such vehicles for public traffic, as cab companies and the like, since the vehicle can by that method be more quickly restored to service. At the same time, more time is afforded for careful inspection of the exhausted battery and for repairs thereto when necessary, as well as for recharging.

My present invention has for its object to provide means for changing batteries in a convenient and expeditious manner, and will be readily understood from a description of the devices illustrated in the annexed drawing which shows what at the present time I consider the best mode of applying the invention.

Referring now to the drawing, Figure 1 is a cross section of a vehicle through the battery chamber or receptacle thereof, showing an old or exhausted battery in place and a new or charged battery about to be substituted therefor. Fig. 2 is a sectional plan view, substantially on line II—II, but omitting the battery trucks and the mechanism for actuating the ram which effects the necessary movement of the batteries.

The vehicle, which of course may be of any kind, for passenger or freight use, has depending from its bed a suitable chamber or receptacle 1, provided at each side of the vehicle with an opening 2, through which the batteries are introduced and removed. Suitable closures, not shown, are preferably provided for closing these openings when the vehicle is in use.

3 indicates a battery in the receptacle 1, for which a fresh battery is to be substituted. 4 and 5 are two trucks, the bed of each being of the same height from the ground as the floor or rails on which the battery in the receptacle or chamber 1 rests. One of the trucks, that indicated by 5 in the drawing, carries the fresh battery, 6, and is arranged between the vehicle and the ram 7 (hereinafter described) with the fresh battery in alinement with, and preferably in contact with, the exhausted battery 3. The other truck, 4, is arranged on the other side of the vehicle, in position to receive the battery 3 as it issues from the receptacle or carrier 1. The trucks may, if desired, be provided with antifriction rollers $4^a$, $5^a$, to reduce the friction incident to the shifting of the batteries, and may also be provided with low railings or guards $4^b$, $5^b$, to prevent accidental displacement of the batteries. In order to hold the trucks positively in position suitable means for fastening them to the vehicle may be provided, for example the hooks $4^c$, $5^c$, engaging eyes on the battery carrier 1 or other convenient part of the vehicle. The batteries are preferably constructed as illustrated in Fig. 2, each comprising a box having two compartments formed by a longitudinal partition, as 8, containing the storage cells, not shown. If the batteries carry electric terminals, as binding posts 9, on their ends, they are provided with suitable buffers, 10, to prevent injury to the said terminals as the fresh battery is forced against the other.

The ram includes a plunger 11, preferably a rack-bar, as shown, having a head 12 which bears against the battery 6 or truck 5; and suitable means for actuating the plunger to force the fresh battery into the carrier 1 and the exhausted battery out of the same and upon the truck 4. The mechanism which I prefer for the purpose is that illustrated in Fig. 1. In this case the plunger, of the rackbar type, is movable longitudinally in a housing 13, and meshes with a pinion 14 journaled in the housing. This pinion is driven, through the instrumentality of suitable reducing gears (merely indicated by the dotted lines), by an electric motor 14 conveniently mounted on the housing.

The operation of the devices will now be readily understood. The vehicle, with its battery carrier open, and the trucks, one with the fresh battery, in the positions shown, the motor 14 is started, and drives the plunger 11 steadily against the battery 6. The latter is thus moved off the truck and into the battery carrier, but at the same time pushes the old battery out of the carrier and on to the truck.

As soon as the fresh battery is entirely within the carrier the motor is stopped; and the batteries being each as long as the width of the carrier, it is evident that when the fresh battery is in position the old battery will have been moved entirely out of the carrier and upon the truck 4. The trucks are now removed, the plunger 11 being retracted to permit withdrawal of truck 5, whereupon the vehicle can be moved off and put into service again.

Practical use of the scheme above described has demonstrated its marked utility for the purpose in hand. In fact batteries weighing several hundred pounds each can be changed by my method in less than thirty seconds.

The apparatus employed is extremely simple and requires the minimum amount of attendance, since, as will be understood at once, one person can readily perform all the necessary manual operations.

What I claim is:

1. The combination with an electrically propelled vehicle having a battery receptacle depending from its bed and provided with an opening at each side of the vehicle, of a pair of battery-trucks on opposite sides of the vehicle in position to deliver a battery into one side of the battery receptacle and receive a battery from the other side, means for detachably connecting the trucks to the vehicle and mechanism for moving a battery from one of the trucks into the receptacle against a battery therein, whereby the latter will be displaced and delivered upon receiving truck.

2. The combination with an electrically propelled vehicle having a battery receptacle depending from its bed and provided with openings at each side of the vehicle, of a pair of battery-trucks on opposite sides of the vehicle in line with the openings in the battery receptacle, means for locking the said trucks to the vehicle and a ram comprising a plunger adapted to bear against a battery on one of the trucks and mechanism for actuating the plunger whereby the said battery will be pushed into the receptacle and will displace the exhausted battery therefrom upon the truck on the opposite side of the vehicle.

3. The combination with an electrically propelled vehicle having a battery receptacle depending from its bed and provided with an opening at each side of the receptacle, of a pair of battery trucks on opposite sides of the vehicle adapted to assume a position to deliver a battery into one side of the battery receptacle and to receive a battery from the other side, means for detachably connecting the trucks and the vehicle so as to provide a substantially continuous platform for the movement of the batteries, said means comprising hooks carried by one of said elements and adapted to engage eyes on the other of said elements.

ALBERT J. DOTY.

Witnesses:
M. LAWSON DYER,
S. S. DUNHAM.